US012217278B1

United States Patent
Anderson

(10) Patent No.: US 12,217,278 B1
(45) Date of Patent: Feb. 4, 2025

(54) LEAD MANAGEMENT PLATFORM FOR TARGETED OUTPUT GENERATION

(71) Applicant: Allstate Insurance Company, Northbrook, IL (US)

(72) Inventor: Erik Anderson, El Dorado Hills, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/474,446

(22) Filed: Sep. 14, 2021

Related U.S. Application Data

(60) Provisional application No. 63/079,041, filed on Sep. 16, 2020.

(51) Int. Cl.
*G06Q 30/0207* (2023.01)
*G06Q 10/0631* (2023.01)
*G06Q 30/0251* (2023.01)

(52) U.S. Cl.
CPC ... *G06Q 30/0207* (2013.01); *G06Q 10/06315* (2013.01); *G06Q 30/0269* (2013.01)

(58) Field of Classification Search
CPC .......... G06Q 30/0207–0277; G06Q 10/06315; G06Q 30/0269
USPC ............................................... 705/7.36, 7.29
See application file for complete search history.

(56) References Cited

U.S. PATENT DOCUMENTS

| | | | |
|---|---|---|---|
| 2002/0072957 A1* | 6/2002 | Thompson | G06Q 10/063 705/7.29 |
| 2003/0093315 A1* | 5/2003 | Sato | G06Q 30/02 705/14.68 |
| 2004/0254810 A1* | 12/2004 | Yamaga | G06Q 30/0255 705/7.29 |
| 2005/0080775 A1* | 4/2005 | Colledge | G06F 16/9535 |
| 2007/0223039 A1* | 9/2007 | Mason | G06Q 30/0251 358/1.18 |
| 2008/0243531 A1* | 10/2008 | Hyder | G06Q 30/02 705/1.1 |

(Continued)

OTHER PUBLICATIONS

Dictionary.com, Life cycle, Jan. 24, 2023, (Year: 2023).*

(Continued)

*Primary Examiner* — Tarek Elchanti
(74) *Attorney, Agent, or Firm* — Dinsmore & Shohl LLP

(57) ABSTRACT

Aspects of the disclosure relate to using machine learning for customized communication output generation. A computing platform may receive lead information from an enterprise user device. Based on the lead information, the computing platform may generate lead management information indicating a communications that should be sent to an individual corresponding to the lead information, where the communications correspond to a plurality of communication types and are each sent on a particular date indicated in the lead management information. The computing platform may send the lead management information and one or more commands directing a communication storage system to select and send each of the communications to the individual on the particular date corresponding to each of the communications, which may cause a client device corresponding to the individual to display each of the communications on the particular date corresponding to each of the communications.

12 Claims, 8 Drawing Sheets

(56) References Cited

U.S. PATENT DOCUMENTS

| | | | | |
|---|---|---|---|---|
| 2010/0312665 | A1* | 12/2010 | Bundy | G06Q 30/0633 |
| | | | | 705/26.8 |
| 2011/0047025 | A1* | 2/2011 | Demir | G06Q 30/0256 |
| | | | | 705/14.54 |
| 2011/0060643 | A1* | 3/2011 | Davis | G06Q 30/02 |
| | | | | 705/1.1 |
| 2011/0066577 | A1* | 3/2011 | Van Gael | G06N 20/00 |
| | | | | 706/50 |
| 2012/0143692 | A1* | 6/2012 | Packer | G06Q 30/0267 |
| | | | | 705/14.64 |
| 2014/0358725 | A1* | 12/2014 | Afaq | G06Q 30/0639 |
| | | | | 705/26.9 |
| 2015/0006248 | A1* | 1/2015 | Li | G06Q 10/06395 |
| | | | | 705/7.31 |
| 2016/0071177 | A1* | 3/2016 | Launay | G06Q 30/0611 |
| | | | | 705/26.4 |
| 2016/0342929 | A1* | 11/2016 | Tanaka | G06Q 10/06314 |
| 2017/0011419 | A1* | 1/2017 | Cai | G06Q 50/01 |
| 2017/0103349 | A1* | 4/2017 | Ersergin | G06Q 50/12 |
| 2019/0139098 | A1* | 5/2019 | Margiolas | G06N 20/00 |
| 2021/0049628 | A1* | 2/2021 | Baird | G06N 20/00 |

OTHER PUBLICATIONS

Shayla Price, How to Create Content for Customer Lifecycle Stages, 2015 (Year: 2015).*
Onecause, 13 Silent Auction Strategies: The Ultimate Guide for Nonprofits, 2020 (Year: 2020).*

* cited by examiner

405

Prospect Interface

We see that you have your own business - we'd like to help! Click below for some special rates on a small business policy tailored for you.

| Great, thanks! | Not right now, thanks. |

Former Customer Interface

We haven't heard from you for a while - let's get back in touch! Click below for some special offers just for you. We hope to hear from you soon!

| Great, thanks! | Not right now, thanks. |

FIG. 5

LEAD MANAGEMENT PLATFORM FOR TARGETED OUTPUT GENERATION

CROSS-REFERENCE TO RELATED APPLICATIONS

The present disclosure claims the benefit of U.S. Pat. App. No. 63/079,041, entitled LEAD MANAGEMENT PLATFORM FOR TARGETED OUTPUT GENERATION, filed Sep. 16, 2020, the entirety of which is incorporated by reference herein.

BACKGROUND

Aspects of the disclosure relate to processing systems. In particular, aspects of the disclosure relate to processing systems for automated communication.

In some instances, individuals may wish to establish regular communication with a prospective, current, or future client. In many instances, however, there may be many different distinct systems and/or services for doing so within a single enterprise organization. This may result in lost efficiencies related to time, processing power, and/or network bandwidth.

SUMMARY

Aspects of the disclosure provide effective, efficient, scalable, and convenient technical solutions that address and overcome the technical problems associated with generation of customized communication outputs.

In accordance with one or more embodiments, a computing platform comprising at least one processor, a communication interface communicatively coupled to the at least one processor, and memory may receive lead information from an enterprise user device. Based on the lead information, the computing platform may generate lead management information indicating a plurality of communications that should be sent to an individual corresponding to the lead information, where the plurality of communications correspond to a plurality of communication types and are each sent on a particular date indicated in the lead management information. The computing platform may send the lead management information and one or more commands directing a communication storage system to select and send each of the plurality of communications to the individual on the particular date corresponding to each of the plurality of communications, which may cause a client device corresponding to the individual to display each of the plurality of communications on the particular date corresponding to each of the plurality of communications.

In one or more instances, the lead management information may indicate that the individual is a prospective client. In one or more instances, the computing platform may receive updated lead information indicating that the individual is one of a current client or a former client. Based on the updated lead information, the computing platform may generate updated lead management information indicating a second plurality of communications that should be sent to the individual, where the second plurality of communications corresponds to the plurality of communication types and are each sent on a particular date indicated in the updated lead management information. The computing platform may send the updated lead management information and one or more commands directing the communication storage system to select and send each of the second plurality of communications to the individual on the particular date corresponding to each of the second plurality of communications, which may cause the client device to display each of the second plurality of communications on the particular date corresponding to each of the second plurality of communications. In one or more instances, the plurality of communication types may include one or more of: snail mail, electronic mail, text message, or phone call.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 depict example graphical user interfaces for lead management output generation in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further below, there may be many options for handling client communication. In some instances, identifying which of these options to use may result in reduced efficiency for individuals initiating the communication (e.g., agents of an insurance institution) and/or ineffective communication. Thus, it may be advantageous to deploy an automated system that may create seamless marketing campaigns for agents. For example, agents may be able to input a prospective client, current client, and/or former client into the system, and communication such as emails, text messages, automated phone calls, snail mail, or other pieces of targeted communication may be automatically generated and sent on a predetermined schedule.

In some instances, this may result in technical solutions to technical problems such as system redundancies. By combining various communication systems into a single platform, efficiencies related to processing power and network bandwidth may be achieved. Furthermore, agents might not need to input individuals into different communication systems and/or modules as they progress through various stages of the customer lifecycle.

Figure 1A:
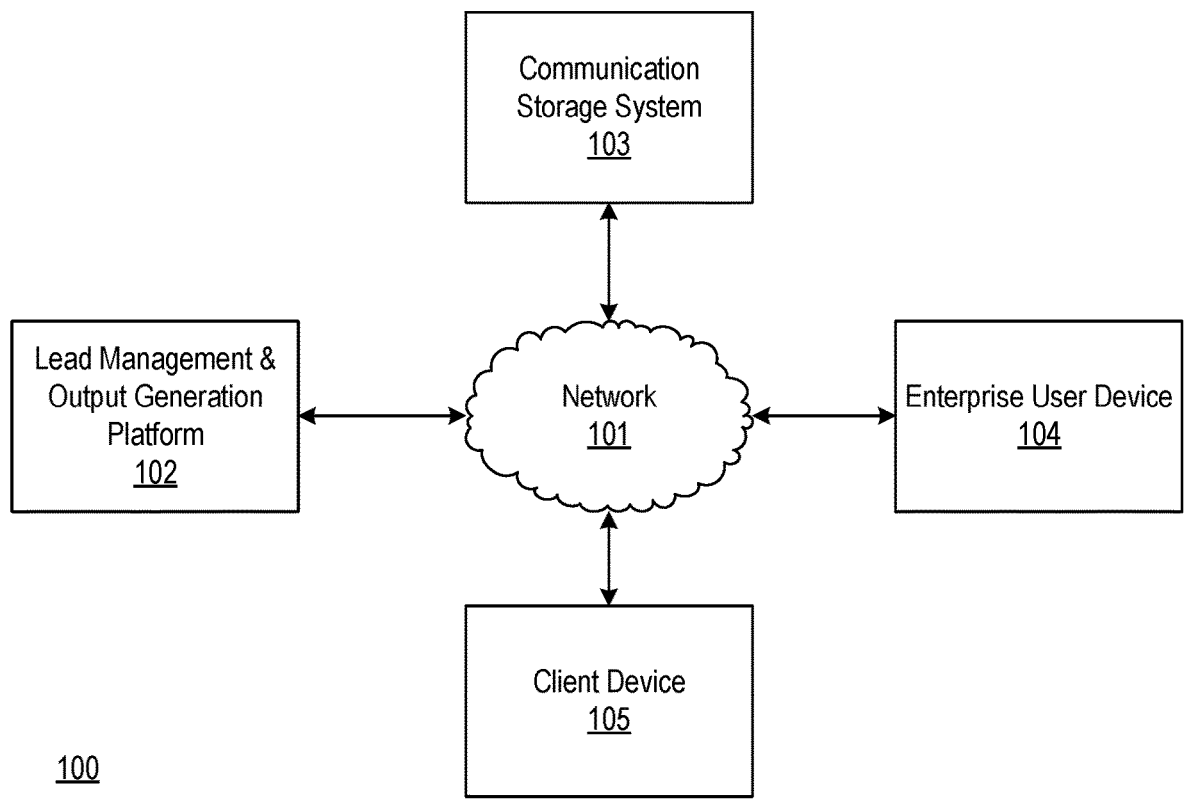
FIGS. 1A and 1B depict an illustrative computing environment for lead management output generation in accordance with one or more example embodiments.
Figure 1B:
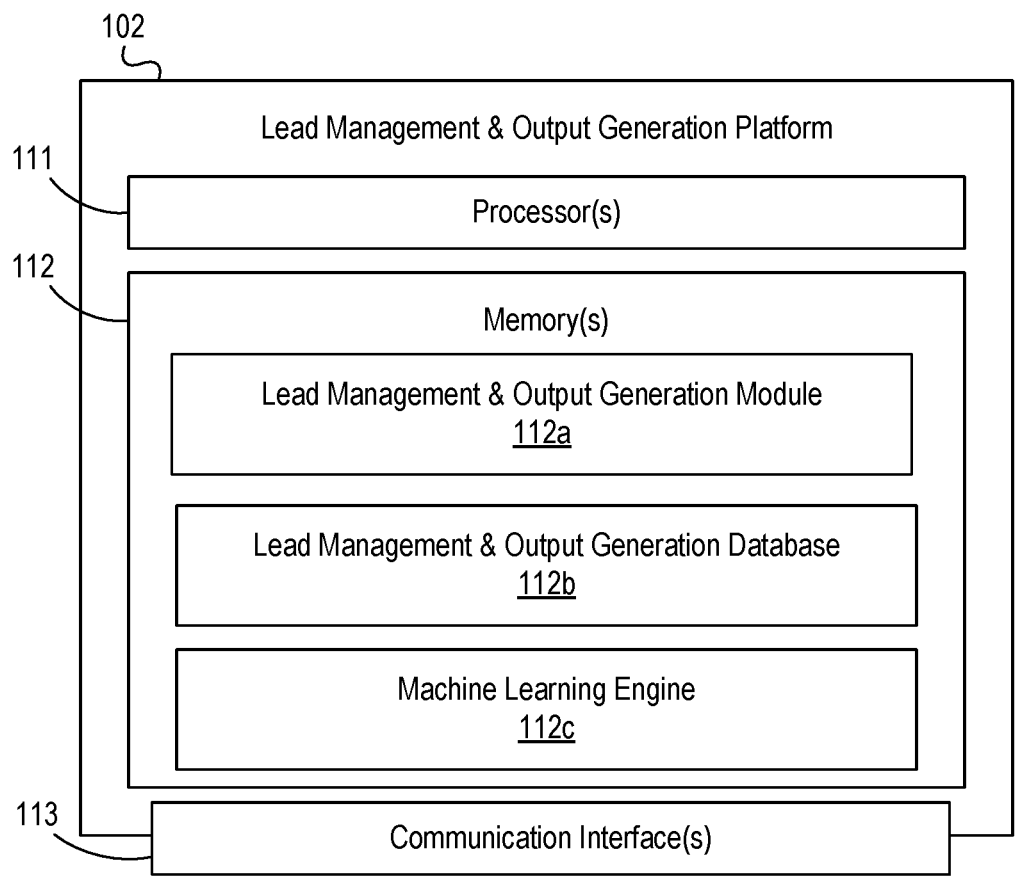

FIGS. 1A and 1B depict an illustrative computing environment for lead management output generation in accordance with one or more example embodiments. Referring to FIG. 1A, computing environment 100 may include one or more computer systems. For example, computing environment 100 may include lead management and output generation platform 102, communication storage system 103, enterprise user device 104, and client device 105.

As illustrated in greater detail below, lead management and output generation platform 102 may include one or more computing devices configured to perform one or more of the functions described herein. For example, lead management and output generation platform 102 may include one or more computers (e.g., laptop computers, desktop computers, servers, server blades, or the like) and/or other computer components (e.g., processors, memories, communication interfaces). In addition, and as illustrated in greater detail below, lead management and output generation platform 102 may be configured to generate a lead management output, which may indicate a series of communications, which may correspond to different communication types, to be sent from an employee of an enterprise organization (e.g., an insurance agent) to a potential, current, or former client on a particular date.

Communication storage system 103 may include one or more computers (e.g., laptop computers, desktop computers, servers, server blades, or the like) and/or other computer components (e.g., processors, memories, communication interfaces). In some instances, communication storage system 103 may be configured to store and provide communications that may be selected and sent to a client device based on the lead management output. For example, the communication storage system 103 may store pre-prepared emails, text messages, automated phone calls, messages that may be sent as snail mail, and/or other message types that may include offers for sale, discounts, product recommendations, and/or other information that may establish two-way communication between an agent and potential, current, or former client. In some instances, the communication storage system 103 may be configured to communicate with the client device 105 and/or otherwise communicate with a user of the client device 105 using these stored messages on the date specified in the lead management output. Although shown as two distinct devices in FIG. 1A, in some instances, communication storage system 103 and lead management and output generation platform 102 may exist and/or operate as a single computing device, system, or platform. Thus, actions described herein as performed by the communication storage system 103 and/or the lead management and output generation platform 102 may be performed by either device respectively without departing from the scope of the disclosure.

Enterprise user device 104 may be a laptop computer, desktop computer, mobile device, tablet, or other personal computing device that may be linked to and/or used by a first user (who may, e.g., be an employee of an enterprise organization, such as an agent at an insurance institution). In some instances, the enterprise user device 104 may be configured to display graphical user interfaces (e.g., which may allow the first user to input lead information and/or define lead management outputs).

Client device 105 may be a laptop computer, desktop computer, mobile device, tablet, or other personal computing device that may be linked to and/or used by a second user (who may, e.g., be a potential, current, or past client of an enterprise organization, such as an insurance institution). In some instances, the client device 105 may be configured to display graphical user interfaces (e.g., which may include communications from the communication storage system 103).

Computing environment 100 also may include one or more networks, which may interconnect one or more of lead management and output generation platform 102, communication storage system 103, enterprise user device 104, client device 105, and/or one or more other systems, public networks, sub-networks, and/or the like. For example, computing environment 100 may include a network 101.

In one or more arrangements, lead management and output generation platform 102, communication storage system 103, enterprise user device 104, client device 105 and/or the other systems included in computing environment 100 may be any type of computing device capable of receiving a user interface, receiving input via the user interface, and/or communicating the received input to one or more other computing devices. For example, the systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of lead management and output generation platform 102, communication storage system 103, enterprise user device 104, and/or client device 105 may, in some instances, be special-purpose computing devices configured to perform specific functions.

Referring to FIG. 1B, lead management and output generation platform 102 may include one or more processors 111, memory 112, and communication interface 113. A data bus may interconnect processor 111, memory 112, and communication interface 113. Communication interface 113 may be a network interface configured to support communication between lead management and output generation platform 102 and one or more networks (e.g., network 101, or the like). Memory 112 may include one or more program modules having instructions that when executed by processor 111 cause lead management and output generation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of lead management and output generation platform 102 and/or by different computing devices that may form and/or otherwise make up lead management and output generation platform 102. For example, memory 112 may have, store, and/or include lead management and output generation module 112a, a lead management and output generation database 112b, and a machine learning engine 112c. Lead management and output generation module 112a may have instructions that direct and/or cause lead management and output generation platform 102 to generate lead management outputs accordingly, as discussed in greater detail below. Lead management and output generation database 112b may store information (e.g., agent profiles, lead management information, or the like) used by lead management and output generation module 112a and/or lead management and output generation platform 102 in generating and updating lead management outputs and/or in performing other functions. Machine learning engine 112c may have instructions that direct and/or cause the lead management and output generation platform 102 to generate lead management outputs and to set, define, and/or iteratively refine optimization rules techniques and/or other parameters used by the lead management and output generation platform 102 and/or other systems in computing environment 100.

Figure 2A:
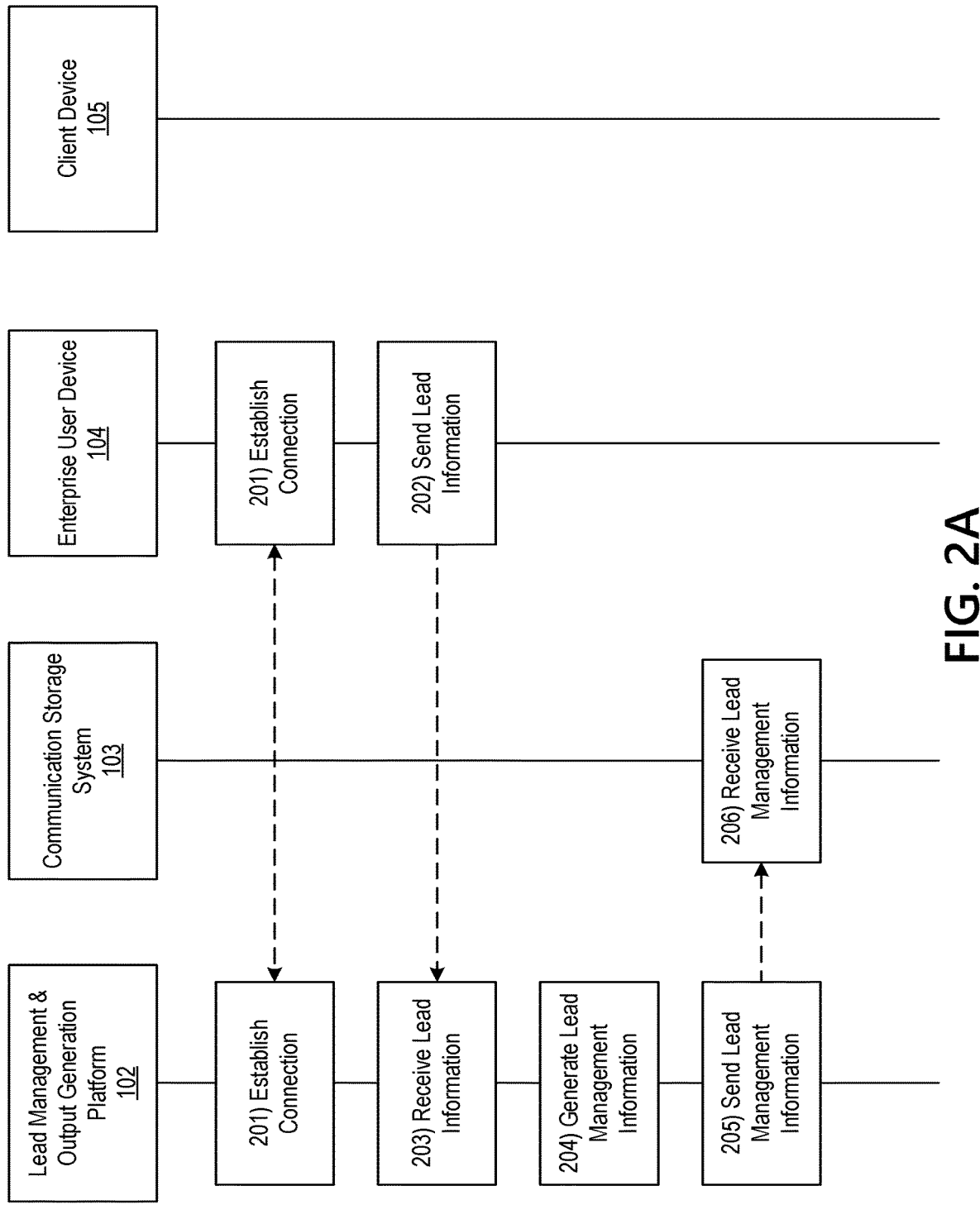
FIGS. 2A-2D depict an illustrative event sequence for lead management output generation in accordance with one or more example embodiments.

FIGS. 2A-2D depict an illustrative event sequence for lead management output generation in accordance with one or more example embodiments. Referring to FIG. 2A, at step 201, the enterprise user device 104 may establish a connection with the lead management and output generation platform 102. For example, the enterprise user device 104 may establish a first wireless data connection with the lead management and output generation platform 102 to link the enterprise user device 104 to the lead management and output generation platform 102. In some instances, the enterprise user device 104 may identify whether or not a connection is already established with the lead management and output generation platform 102. If a connection is already established with the lead management and output generation platform 102, the enterprise user device 104 might not re-establish the connection. If a connection is not yet established with the lead management and output generation platform 102, the enterprise user device 104 may establish the first wireless data connection as described herein.

At step 202, the enterprise user device 104 may send lead information to the lead management and output generation platform 102. For example, the enterprise user device 104 may send the lead information to the lead management and output generation platform 102 while the first wireless data connection is established. In some instances, in sending the lead information, the enterprise user device 104 may send identification (e.g., a name) or other contact (e.g., phone number, address, email, or the like) information (which may e.g., have been received as a user input at the enterprise user device 104) to the lead management and output generation platform 102. For example, the enterprise user device 104 may receive the lead information from a user of the enterprise user device 104, who may be an employee of an enterprise organization (e.g., an agent of an insurance institution). In some instances, in sending the lead information to the lead management and output generation platform 102, the enterprise user device 104 may send information identifying a potential, current, or former client for an enterprise organization (e.g., an insurance institution).

At step 203, the lead management and output generation platform 102 may receive the lead information sent at step 202. For example, the lead management and output generation platform 102 may receive the lead information via the communication interface 113 and while the first wireless data connection is established.

At step 204, the lead management and output generation platform 102 may generate lead management information (e.g., a lead management output) based on the lead information received at step 203. For example, the lead management and output generation platform 102 may generate information indicating a sequence of communications that should be sent to the user of the client device 105, including a type of communication and send date for each communication. In some instances, the lead management and output generation platform 102 may generate the lead management information using machine learning and/or a stored database. For example, the lead management and output generation platform 102 may generate the lead management information using one or more machine learning techniques such as supervised learning, unsupervised learning, semi-supervised learning, reinforcement learning, self-learning, feature learning, anomaly detection, and/or other machine learning techniques (e.g., using one or more machine learning models such as artificial neural networks, decision trees, support vector machines, regression analysis, Bayesian analysis, and/or other techniques). For example, the lead management and output generation platform 102 may store first lead management information that should be generated if the lead information indicates a potential client, second lead management information that should be generated if the lead information indicates a current client, and third lead management information that should be generated if the lead information indicates a former client. In some instances, the lead management and output generation platform 102 may further store customized lead management information for each enterprise user (e.g., insurance agent). For example, the lead management and output generation platform 102 may store different first, second, and third lead management information for each agent. In some instances, the lead management and output generation platform 102 may store more granular lead management information. For example, the lead management and output generation platform 102 may store different lead management information within the categories of potential, current, and/or future client based on how long an individual has been in that category (e.g., change a schedule, method, and/or content of communication once an individual has been a client for over a year, or the like). In some instances, this lead management information may be input or otherwise defined by an enterprise user (e.g., a user of the enterprise user device 104). Additionally or alternatively, the lead management and output generation platform 102 may apply one or more machine learning techniques to identify (such as via a ranking) lead management information that is most effective in closing a sale, client retention, and/or otherwise achieving a successful outcome or purpose, and may use this lead management information. In generating the lead management information, the lead management and output generation platform 102 may generate, for a given individual identified by the lead information, a communication schedule that includes a type of communication and a date or time for the communication. For example, the lead management and output generation platform 102 may generate lead management information indicating that communications should be sent to the identified individual according to the following schedule: day 1-snail mail, day 5-automated phone call, day 10-email, day 13-snail mail, day 17-automated phone call, day 21-email.

At step 205, the lead management and output generation platform 102 may send the lead management information, generated at step 204, to the communication storage system 103. For example, the lead management and output generation platform 102 may establish a second wireless data connection with the communication storage system 103 to link the lead management and output generation platform 102 to the communication storage system 103. In some instances, the lead management and output generation platform 102 may identify whether or not a connection is already established with the communication storage system 103. If a connection is already established with the communication storage system 103, the lead management and output generation platform 102, the lead management and output generation platform 102 might not establish the connection. If a connection is not yet established with the communication storage system 103, the lead management and output generation platform 102 may establish the second wireless data connection as described herein. The lead management and output generation platform 102 may send the lead management information to the communication storage system 103 via the communication interface 113 and while the second wireless data connection is established.

In some instances, along with the lead management information, the lead management and output generation platform 102 may send one or more commands directing the communication storage system 103 to select a communication based on the lead management information. In these instances, the lead management and output generation platform 102 may ultimately cause the client device 105 to display the selected communication.

At step 206, the communication storage system 103 may receive the lead management information sent at step 205. For example, the communication storage system 103 may receive the lead management information while the second wireless data connection is established. In some instances, the communication storage system 103 may receive the one or more commands directing the communication storage system 103 to select a communication based on the lead management information.

Figure 2B:
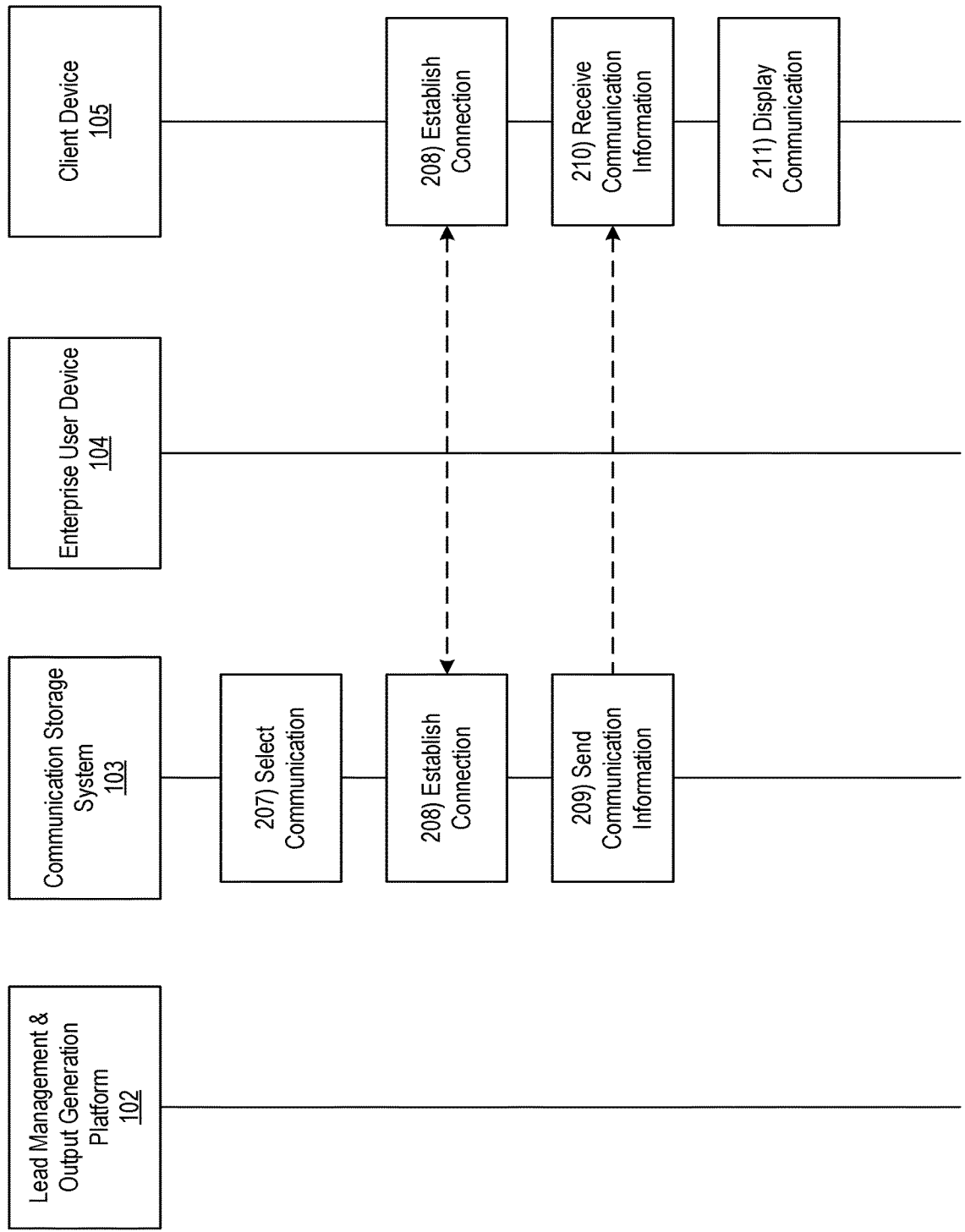

Referring to FIG. 2B, at step 207, the communication storage system 103 may select a communication based on the lead management information received at step 206. For example, the communication storage system 103 may select a communication based on the individual to which the communication is directed (e.g., potential client, current client, or former client) and the type of communication that should be sent (e.g., snail mail, email, text message, automated voice call, or other type of communication). For example, in selecting the communication, the communication storage system 103 may select a communication indicating a promotion, offer, discounts, and/or other information that may prompt a target recipient to engage with the enterprise organization (e.g., engage with the agent of the insurance institution). In some instances, the communication storage system 103 may select the communication based on information corresponding to the target individual (e.g., if an individual is a small business owner, may include an offer related to small business products). Similarly, if the target individual is a former customer, the communication storage system 103 may select a communication indicating "it's been a year since we've seen you," "we miss you," and/or other similar language. In some instances, the communication storage system 103 may select the communication based on or in response to the one or more commands from the lead management and output generation platform 102 to select a communication.

At step 208, the communication storage system 103 may establish a connection with the client device 105. For example, the communication storage system 103 may establish a third wireless data connection with the client device 105 to link the communication storage system 103 to the client device 105. In some instances, the communication storage system 103 may identify whether or not a connection is already established with the client device 105. If a connection is already established with the client device 105, the communication storage system 103 might not re-establish the connection with the client device 105. If a connection is not yet established with the client device 105, the communication storage system 103 may establish the third wireless data connection as described herein.

At step 209, the communication storage system 103 may send communication information, which may be used to display the selected communication, to the client device 105. In some instances, the communication storage system 103 may send the communication information to the client device 105 while the third wireless data connection is established. In some instances, the communication storage system 103 may send one or more commands directing the client device 105 to display the selected communication based on the communication information.

At step 210, the client device 105 may receive the communication information sent at step 209. For example, the client device 105 may receive the communication information while the third wireless data connection is established. In some instances, the client device 105 may receive one or more commands directing the client device 105 to display the communication based on the communication information.

At step 211, the client device 105 may display the communication based on or in response to the one or more commands directing the client device 105 to display the communication based on the communication information. For example, in displaying the communication, the client device 105 may display a graphical user interface similar to graphical user interface 405, which is shown in FIG. 4. For example, the client device 105 may display a message that is prompting a prospective client to engage with the enterprise organization. In some instances, the client device 105 may display the communication based on or in response to one or more commands from the lead management and output generation platform 102.

Figure 2C:
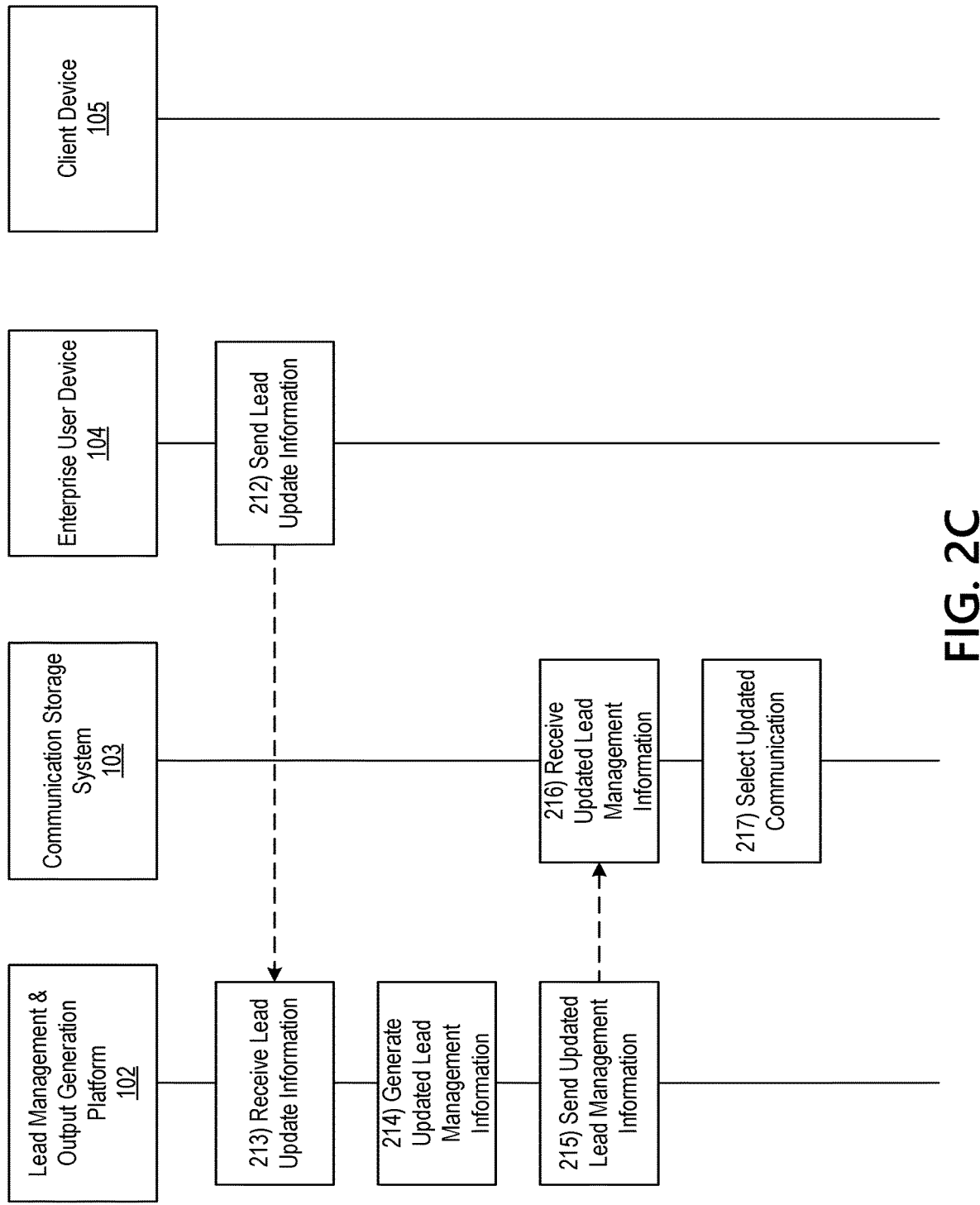

Referring to FIG. 2C, at step 212, the enterprise user device 104 may send lead update information. For example, the individual corresponding to the client device 105 may have previously been a prospective client, but then may have signed on as a client with the enterprise organization. Subsequently, in this example, after some time as a client, the individual may have ended their relationship with the enterprise organization. Accordingly, because different communications should be sent to individuals based on their positions within a client lifecycle (e.g., prospective, current, or former client), the enterprise user device 104 may send lead update information to the lead management and output generation platform 102 indicating that a change has occurred and that updated lead management information should be generated. In these instances, the enterprise user device 104 may send the lead update information to the lead management and output generation platform 102 while the first wireless data connection is established. In some instances, actions performed at step 212 may be similar to those described above at step 202.

At step 213, the lead management and output generation platform 102 may receive the lead update information sent at step 212. For example, the lead management and output generation platform 102 may receive the lead update information via the communication interface 113 and while the first wireless data connection is established. Actions performed at step 213 may be similar to those described above at step 203.

At step 214, the lead management and output generation platform 102 may generate updated lead management information based on the lead update information received at step 213. In some instances, actions performed at step 214 may be similar to those described above at step 204 with regard to the lead management information. Accordingly, by generating updated lead management information with the same system used to generate the initial lead management information, the lead management and output generation platform 102 is configured to provide communication to various target individuals through their respective customer lifecycles (e.g., from prospective client to client to former client, or other similar combinations of those stages), without prompting an agent to sign up for and/or input customer information into new systems at each stage of the customer lifecycle for each individual. For example, the lead management and output generation platform 102 may automatically attach workflows from an agent to target individuals that may cause automated communication from the agent to the target individuals throughout all stages of the customer lifecycle.

At step 215, the lead management and output generation platform 102 may send the updated lead management information to the communication storage system. Actions performed at step 215 may be similar to those described at step 205 with regard to the lead management information.

At step 216, the communication storage system 103 may receive the updated lead management information sent at step 215. In some instances, actions performed at step 216 may be similar to those described above with regard to the lead management information at step 206.

At step 217, the communication storage system 103 may select an updated communication based on the updated lead management information. In some instances, actions performed at step 217 may be similar to those described above with regard to the communication at step 207.

Figure 2D:
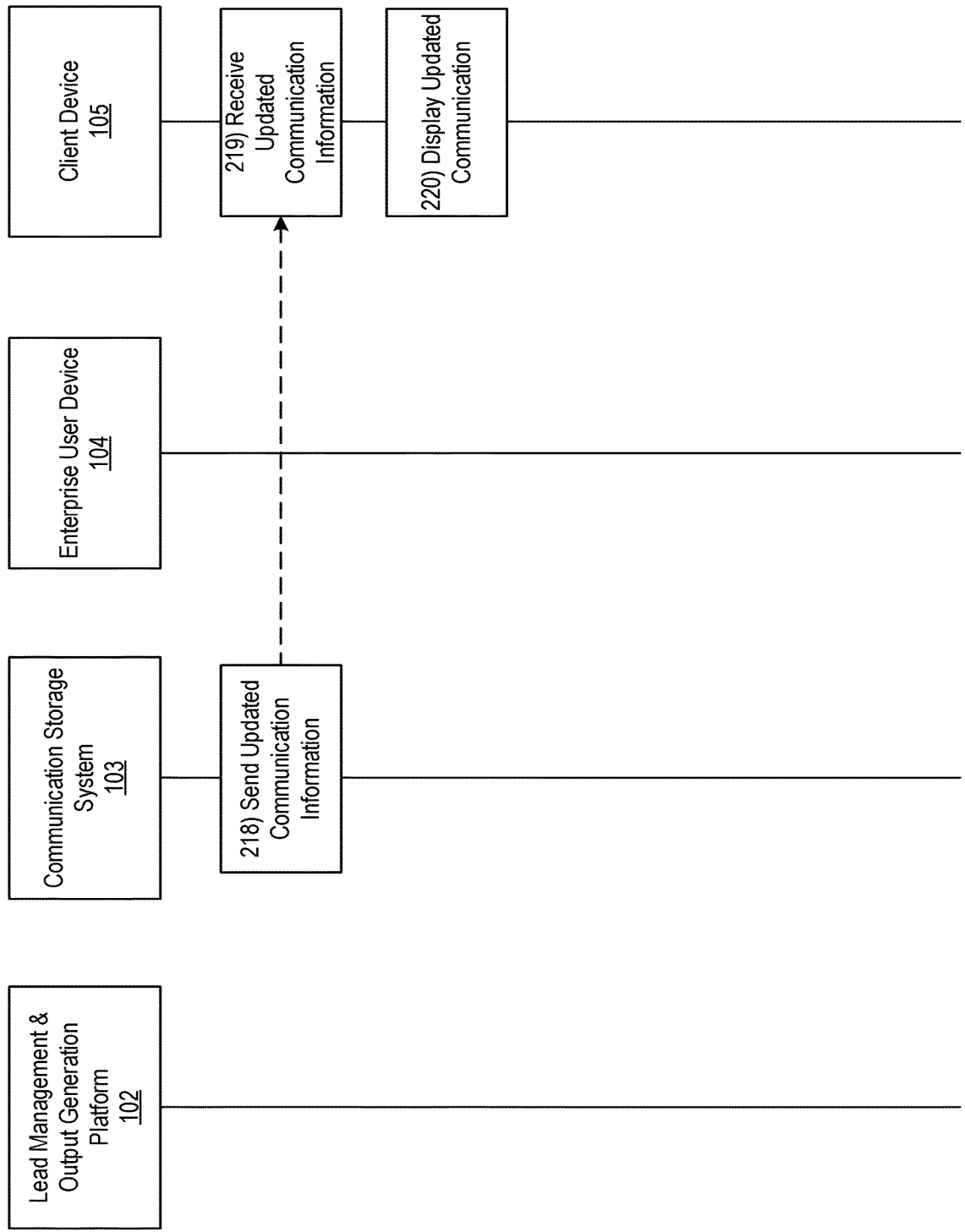

Referring to FIG. 2D, at step 218, the communication storage system 103 may send the updated communication information to the client device 105. Actions described at step 218 may be similar to those described above at step 209 with regard to the communication information.

At step 219, the client device 105 may receive the updated communication information sent at step 219. Actions performed at step 219 may be similar to those described above at step 219 with regard to the communication information.

At step 220, the client device 105 may display the updated communication. For example, the client device 105 may display a graphical user interface similar to graphical user interface 505, which is shown in FIG. 5. For example, the client device 105 may display a former customer interface that may include information to prompt the target recipient to re-engage with the enterprise organization (e.g., the agent of the insurance institution). Actions performed at step 220 may be similar to those described above at step 211 with regard to the communication.

Figure 3:
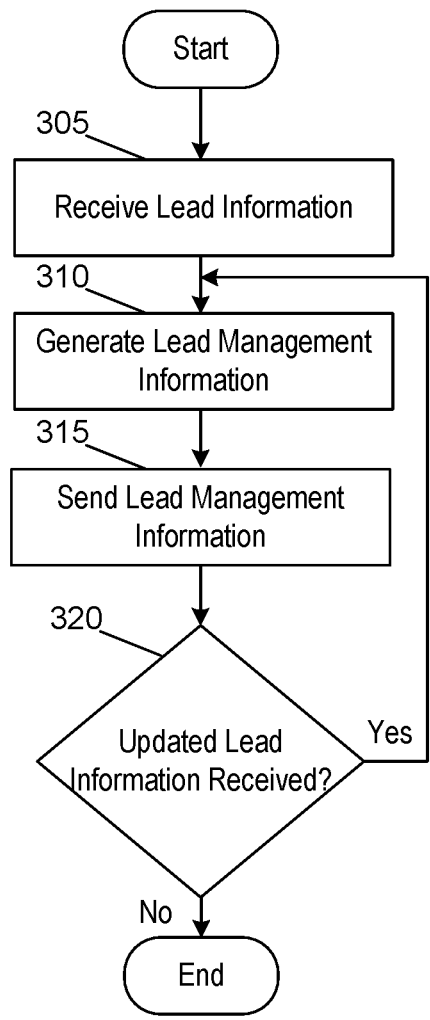
FIG. 3 depicts an illustrative method for lead management output generation in accordance with one or more example embodiments.

FIG. 3 depicts an illustrative method for lead management output generation in accordance with one or more example embodiments. Referring to FIG. 3, at step 305, a computing platform having at least one processor, a communication interface, and a memory may receive lead information. At step 310, the computing platform may use the lead information to generate lead management information. At step 315, the computing platform may send the lead management information to a communication storage system. At step 320, the computing platform may identify whether or not updated lead information has been received. If updated lead information has been received, the computing platform may return to step 310. If updated lead information has not been received, the method may end.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive lead information from an enterprise user device;

determine a stage of a client lifecycle of an individual based on the lead information received by the enterprise user device;

generate, by applying machine learning, lead management information based on an amount of time that the individual has been in the stage of the client lifecycle, the lead management information indicating a plurality of communications that should be sent to the individual corresponding to the lead information, wherein the plurality of communications correspond to a plurality of communication types;

predict, by applying machine learning, the plurality of communications effective in generating a shift in the client lifecycle of the individual, the plurality of communications further corresponding to a plurality of communication content, wherein predicting the plurality of communications effective in generating the shift in the client lifecycle further involves identifying the plurality of communications effective for generating the shift in the client lifecycle and ranking the plurality of communications based on a likelihood of generating the shift in the client lifecycle;

sequence, by applying machine learning, the predicted plurality of communications effective in generating the shift in the client lifecycle of the individual to create a schedule for providing the predicted plurality of communications to the individual on a particular date indicated in the lead management information; and send the lead management information and one or more commands directing a communication storage system to select and send each of the plurality of communications to the individual on the particular date corresponding to each of the plurality of communications, wherein sending the lead management information and the one or more commands directing the communication storage system to select and send each of the plurality of communications to the individual on the particular date corresponding to each of the plurality of communications causes a client device corresponding to the individual to display each of the plurality of communications on the particular date corresponding to each of the plurality of communications;

wherein the stage of the client lifecycle identifies the individual as a prospective client, a current client, or a former client;

receive updated lead information, wherein the updated lead information indicates that the individual is in a changed stage of the client lifecycle;

generate, based on the updated lead information, updated lead management information indicating a second plurality of communications that should be sent to the individual, wherein the second plurality of communications corresponds to the plurality of communication types and are each sent on a particular date indicated in the updated lead management information; and send the updated lead management information and one or more commands directing the communication storage system to select and send each of the second plurality of communications to the individual on the particular date corresponding to each of the second plurality of communications, wherein sending the updated lead management information and the one or more commands directing the communication storage system to select and send each of the second plurality of communications to the individual on the particular date corresponding to each of the second plurality of communications causes the client device to display each of the second plurality of communications on the particular date corresponding to each of the second plurality of communications.

2. The computing platform of claim 1, wherein the plurality of communication types comprise one or more of: snail mail, electronic mail, text message, or phone call.

3. The computing platform of claim 1, wherein the plurality of communications comprise one or more of: offers for sale, discounts, or product recommendations.

4. The computing platform of claim 1, wherein at least one communication of the plurality of communications is configured to provide an accept or reject option to the individual for selection to establish a two-way communication.

5. The computing platform of claim 1, wherein the memory stores additional computer-readable instructions that, when executed by the at least one processor, further cause the computing platform to:

apply machine learning to identify the lead management information ranked most effective for a purpose, wherein the purpose comprises one of closing a sale or client retention.

6. The computing platform of claim 1, wherein the plurality of communications are automatically sent on behalf of an agent to the individual.

7. A computing platform comprising:

at least one processor;

a communication interface communicatively coupled to the at least one processor; and memory storing computer-readable instructions that, when executed by the at least one processor, cause the computing platform to:

receive lead information from an enterprise user device, wherein the lead information indicates a stage of an individual in a client lifecycle, and the stage indicates the individual as a prospective client, a former client, or a current client of an agent;

generate, by applying machine learning, lead management information based on an amount of time that the individual has been in the stage of the client lifecycle, the lead management information indicating a plurality of communications that should be sent to the individual corresponding to the lead information, wherein the plurality of communications correspond to a plurality of communication types;

predict, by applying machine learning, the plurality of communications effective in generating a shift in the client lifecycle of the individual, the plurality of communications further corresponding to a plurality of communication content, wherein predicting the plurality of communications effective in generating the shift in the client lifecycle further involves identifying the plurality of communications effective for generating the shift in the client lifecycle and ranking the plurality of communications based on a likelihood of generating the shift in the client lifecycle;

sequence, by applying machine learning, the predicted plurality of communications effective in generating the shift in the client lifecycle of the individual to create a schedule for providing the predicted plurality of communications to the individual on a particular date indicated in the lead management information;

send the lead management information and one or more commands directing a communication storage system to select and send each of the plurality of communications to the individual on the particular date corresponding to each of the plurality of communications, wherein sending the lead management information and the one or more commands directing the communication storage system to select and send each of the plurality of communications to the individual on the particular date corresponding to each of the plurality of communications causes a client device corresponding to the individual to display each of the plurality of communications on the particular date corresponding to each of the plurality of communications, wherein the plurality of communications are automatically sent on behalf of the agent to the individual;

receive updated lead information, wherein the updated lead information indicates that the individual is in a changed stage of the client lifecycle;

generate, based on the updated lead information, updated lead management information indicating a second plurality of communications that should be sent to the individual, wherein the second plurality of communications corresponds to the plurality of communication types and are each sent on a particular date indicated in the updated lead management information; and send the updated lead management information and one or more commands directing the communication storage system to select and send each of the second plurality of communications to the individual on the particular date corresponding to each of the second plurality of communications, wherein sending the updated lead management information and the one or more commands directing the communication storage system to select and send each of the second plurality of communications to the individual on the particular date corresponding to each of the second plurality of communications causes the client device to display each of the second plurality of communications on the particular date corresponding to each of the second plurality of communications.

8. The computing platform of claim 7, wherein the plurality of communication types comprise one or more of: snail mail, electronic mail, text message, or phone call.

9. The computing platform of claim 7, wherein the plurality of communications comprise one or more of: offers for sale, discounts, or product recommendations.

10. The computing platform of claim 7, wherein at least one communication of the plurality of communications is configured to provide an accept or reject option to the individual for selection to establish a two-way communication.

11. The computing platform of claim 7, wherein the memory stores additional computer-readable instructions that, when executed by the at least one processor, further cause the computing platform to:

apply machine learning to identify the lead management information ranked most effective for a purpose, wherein the purpose comprises one of closing a sale or client retention.

12. A method comprising:

receiving, via a processor of a computing platform, lead information from an enterprise user device communicatively coupled to the processor of the computing platform;

determining a stage of a client lifecycle of an individual based on the lead information received by the enterprise user device;

generating, by applying machine learning, lead management information based on an amount of time that the individual has been in the stage of the client lifecycle, the lead management information indicating a plurality of communications that should be sent to an individual corresponding to the lead information, wherein the plurality of communications correspond to a plurality of communication types;

predicting, by applying machine learning, the plurality of communications effective in generating a shift in the client lifecycle of the individual, the plurality of communications further corresponding to a plurality of communication content, wherein predicting the plurality of communications effective in generating the shift in the client lifecycle further involves identifying the plurality of communications effective for generating the shift in the client lifecycle and ranking the plurality of communications based on a likelihood of generating the shift in the client lifecycle;

sequencing, by applying machine learning, the predicted plurality of communications effective in generating the shift in the client lifecycle of the individual to create a schedule for providing the predicted plurality of communications to the individual on a particular date indicated in the lead management information;

sending, via the processor, the lead management information and one or more commands directing a communication storage system to select and send each of the plurality of communications to the individual on the particular date corresponding to each of the plurality of communications, wherein sending the lead management information and the one or more commands directing the communication storage system to select and send each of the plurality of communications to the individual on the particular date corresponding to each of the plurality of communications causes a client device communicatively coupled to the processor and corresponding to the individual to display each of the plurality of communications on the particular date corresponding to each of the plurality of communications;

wherein the stage of the client lifecycle identifies the individual as a prospective client, a current client, or a former client;

receiving updated lead information, wherein the updated lead information indicates that the individual is in a changed stage of the client lifecycle;

generating, based on the updated lead information, updated lead management information indicating a second plurality of communications that should be sent to the individual, wherein the second plurality of communications corresponds to the plurality of communication types and are each sent on a particular date indicated in the updated lead management information; and sending the updated lead management information and one or more commands directing the communication storage system to select and send each of the second plurality of communications to the individual on the particular date corresponding to each of the second plurality of communications, wherein sending the updated lead management information and the one or more commands directing the communication storage system to select and send each of the second plurality of communications to the individual on the particular date corresponding to each of the second plurality of communications causes the client device to display each of the second plurality of communications on the particular date corresponding to each of the second plurality of communications.

\* \* \* \* \*